United States Patent
Harris et al.

(10) Patent No.: US 7,089,860 B2
(45) Date of Patent: *Aug. 15, 2006

(54) PROVIDING CUSTOMIZED TEXT AND IMAGERY ON ORGANIC PRODUCTS

(75) Inventors: Blaine Harris, Bountiful, UT (US);
Terrell Lassetter, Bountiful, UT (US);
Rene Rodriguez, Layton, UT (US)

(73) Assignee: Speaking Roses International, Inc., Salt Lake City, UT (US)

(*) Notice: Subject to any disclaimer, the term of this patent is extended or adjusted under 35 U.S.C. 154(b) by 0 days.

This patent is subject to a terminal disclaimer.

(21) Appl. No.: 11/061,788

(22) Filed: Feb. 18, 2005

(65) Prior Publication Data

US 2005/0139112 A1    Jun. 30, 2005

(51) Int. Cl.
*B41F 1/34* (2006.01)
(52) U.S. Cl. .......................... 101/483; 101/35
(58) Field of Classification Search ............ 101/35–44, 101/169, 327, 483; 347/96, 105, 112, 262, 347/264; 219/121.68, 121.69
See application file for complete search history.

(56) References Cited

U.S. PATENT DOCUMENTS

| 4,843,958 A | 7/1989 | Egosi .......................... 101/2 |
| 5,142,976 A | 9/1992 | Roulleau ..................... 101/41 |
| 5,305,550 A | 4/1994 | Skonecki ..................... 47/58 |
| 5,424,141 A | 6/1995 | Croner ........................ 428/195 |
| 5,637,139 A * | 6/1997 | Morelos et al. .......... 106/31.37 |
| 5,660,747 A | 8/1997 | Drouillard et al. .......... 219/121 |
| 5,897,797 A | 4/1999 | Drouillard et al. .......... 219/121 |
| 6,172,328 B1 | 1/2001 | Jones et al. ................. 219/121 |
| 6,180,914 B1 | 1/2001 | Jones et al. ................. 219/121 |
| 6,371,609 B1 | 4/2002 | Oikawa ....................... 347/96 |
| 6,499,842 B1 | 12/2002 | Stiber et al. ................ 347/105 |
| 2002/0134257 A1 | 9/2002 | Stephenson .................. 101/35 |
| 2003/0136281 A1 | 7/2003 | Clark et al. .................. 101/41 |

FOREIGN PATENT DOCUMENTS

| FR | 2815816 | 5/2002 |
| JP | 10309764 | 11/1998 |

OTHER PUBLICATIONS

Severn, Josephine, "Handmade paper", pp. 1-7, 1999.

* cited by examiner

*Primary Examiner*—Minh Chau
(74) *Attorney, Agent, or Firm*—Kirton & McConkie; Michael F. Krieger

(57) ABSTRACT

The present invention features various systems and methods for providing an image on an organic product to provide a communication to the recipient or otherwise individualize the organic product. Notably, the present invention features an organic product printing system comprising at least one organic product; a support structure that secures one or more organic products therein for printing upon them, wherein the support structure comprises a stabilizer bar for supporting one or more printing assemblies; and at least one printing assembly supported within the support structure, wherein the printing assembly comprises a printing device that prints an image onto the organic product.

9 Claims, 10 Drawing Sheets

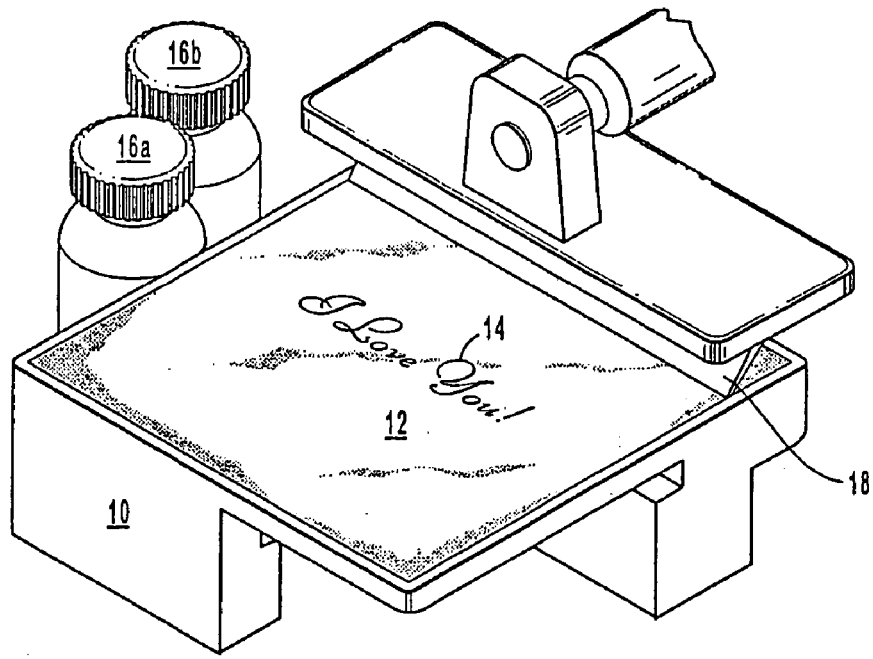
FIG. 1
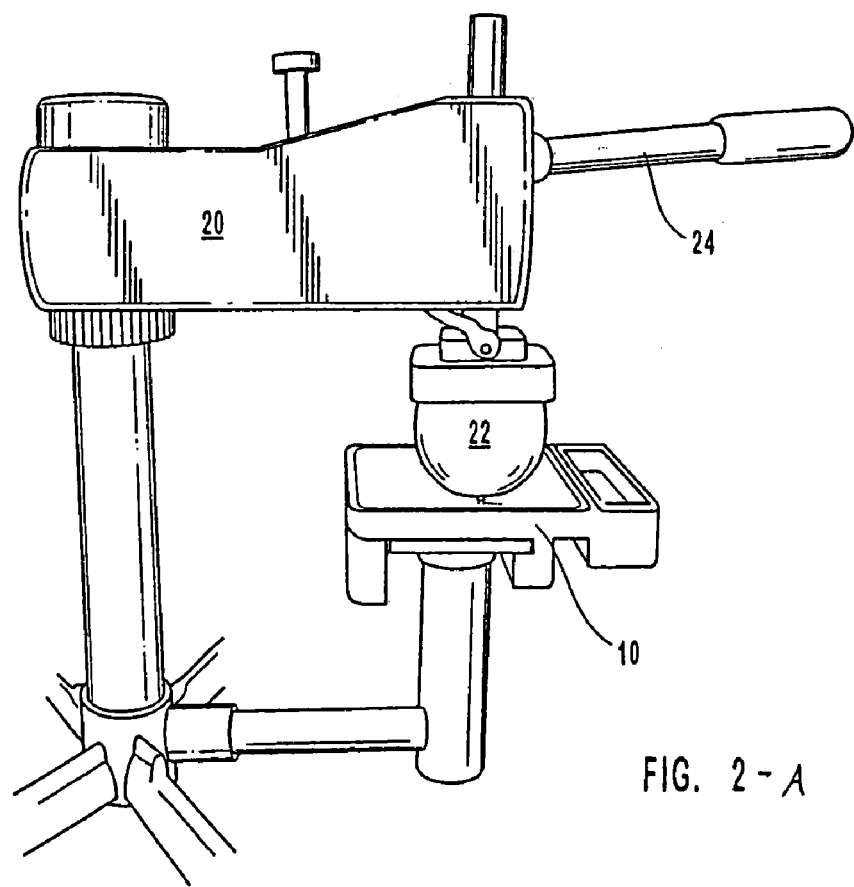
FIG. 2-A

FIG. 2-B

PROVIDING CUSTOMIZED TEXT AND IMAGERY ON ORGANIC PRODUCTS

RELATED APPLICATIONS

This application claims priority to U.S. patent application Ser. No. 10/418,956 filed Apr. 18, 2003, entitled "Providing Customized Text and Imagery on Organic Products," and to U.S. patent application Ser. No. 09/964,989, filed Sep. 26, 2001, entitled "Providing an Image on an Organic Product," which are incorporated by reference in their entirety herein.

BACKGROUND OF THE INVENTION AND RELATED ART

1. Field of the Invention

The present invention relates to improved systems and methods for providing an image on an item. More particular, the present invention relates to systems and methods for providing an image, such as one or more characters, symbols, pictures, imagery, and/or designs, onto an organic product, such as a plant, flower, fruit or portion thereof.

2. Background and Related Art

Organic products, such as flowers and fruit, are commonly exchanged as gifts for a variety of reasons. For example, flowers are given to celebrate such occasions as anniversaries, birthdays, graduations, promotions, retirements, and other meaningful events. Flowers have also been used to express feelings of appreciation, friendship, love, romance, and sympathy. Similarly, fruit and/or other organic products have been packaged into gift baskets and exchanged as holiday gifts.

When an organic product is delivered as a gift to the intended recipient, a card that is written by the purchaser or by another individual on behalf of the purchaser typically accompanies the gift. For example, a purchaser may contact a local florist to place an order for one or more flowers that are to be given as a gift to a particular recipient. The purchaser may receive the flowers and deliver them personally or may allow the florist to deliver the flowers to the intended recipient on behalf of the purchaser. When the purchaser is present at the local floral shop, the purchaser may express his/her feelings on a card that will accompany the delivery of the flowers. Alternatively, when not in person at the floral shop, an employee of the shop may prepare a card on behalf of the purchaser that will accompany the flowers when delivered and that expresses the sentiments of the purchaser.

While the flowers provide a gift to the recipient, it is the card that is the medium used to communicate a particular message or expression from the purchaser to the recipient. When the flowers are delivered without a card, the recipient is required to interpret the meaning of the gift, which can result in an erroneous conclusion.

SUMMARY OF THE INVENTION

The present invention relates to systems and methods for providing an image on an item. More particular, the present invention relates to systems and methods for providing an image, such as one or more characters, symbols, pictures and/or designs, onto an organic product, such as a plant, flower, fruit or portion thereof.

Implementation of the present invention takes place in association with at least a portion of an organic product, such as a portion of a flower, plant, or fruit. An image is provided and printed on the portion of the organic product to provide a communication to the recipient. The image may include feelings of expression, such as the words "I Love You," "Congratulations," "Thank You," "I'm Sorry," "Merry Christmas," or "Happy Birthday." Alternatively, the image may be a logo of a company and optionally may include a particular number of years that the recipient has worked for the company. As such, the printing on the organic product is customizable, thus individualizing the product.

In one exemplary embodiment or implementation, the image that is to be printed onto an organic product, such as a flower, is photo-etched into a photosensitive material of a cliché, such as a printing plate or plane, by the use of a film positive. In another embodiment, the cliché comprises a plastic plate that the image is engraved into using an electronic engraver within a computer system. Once the image is formed, ink is then applied to the cliché and a transfer medium is pressed onto the cliché in order to lift ink from the image area of the cliché and create a negative image on the transfer medium. The transfer medium is used to transfer the inked image onto an organic product, such as a flower petal or leaf. In one embodiment, this is an automated process, where in another embodiment, the image is transferred manually, where the user lifts the organic product up to the transfer medium and manually applies or transfers the image onto the organic product. The transferred image is then allowed to dry so as to remain on the flower petal or leaf and may be used to communicate a message to and/or individualize the gift for the intended recipient.

The present invention further features an organic product printing system operated within a computerized environment. The system comprises at least one organic product; a support structure that secures one or more organic products therein for printing upon them, wherein the support structure comprises a stabilizer bar for supporting one or more printing assemblies; and at least one printing assembly supported within the support structure, wherein the printing assembly comprises a printing device that prints an image onto the organic product.

In one exemplary embodiment, the printing assembly comprises an ink jet printing assembly. In another exemplary embodiment, the printing assembly comprises an electrostatic printing device. In still another exemplary embodiment, the printing assembly comprises a laser printing device. In yet another exemplary embodiment, the printing assembly comprises a contact printing device, such as a roll-on printing device capable of transferring ink thereon to the organic product.

Although several exemplary systems and processes for using various types of ink jet, electrostatic, laser, or contact printing devices will be generally discussed below, the particular and specific details or science behind each of these is not specifically discussed, except as necessary to explain and set forth the present invention. In addition, although not all types of printing systems and methods are described herein, suffice it to say that the present invention contemplates using any and all types of printing systems and/or methods known in the art to print an image onto an organic product. Stated differently, other similar methods, systems, and/or devices may be used to carry out the function of the present invention, namely to provide customizable printing of various images and text on an organic product, that will be apparent to one of ordinary skill in the art. As such, the present invention seeks to include within its scope all of those methods and systems or devices that are capable of, or that are designed to, provide customized printing on an organic product.

Moreover, while the methods and processes of the present invention are particularly useful in the floricultural industry, those skilled in the art can appreciate that the methods and processes can be used in a variety of different applications and in a variety of different areas of manufacture to yield printing on organic products or on portions thereof.

These and other features and advantages of the present invention will be set forth or will become more fully apparent in the description that follows, as well as in the appended claims. The features and advantages may be realized and obtained by means of the instruments and combinations particularly pointed out in the appended claims. Furthermore, the features and advantages of the invention may be learned by the practice of the invention or will be obvious from the description, as set forth hereinafter.

BRIEF DESCRIPTION OF THE DRAWINGS

In order that the manner in which the above recited and other features and advantages of the present invention are obtained, a more particular description of the invention will be rendered by reference to specific embodiments thereof, which are illustrated in the appended drawings. Understanding that the drawings depict only typical embodiments of the present invention and are not, therefore, to be considered as limiting the scope of the invention, the present invention will be described and explained with additional specificity and detail through the use of the accompanying drawings in which:

FIG. 1 provides an illustration of a representative image that is created on a cliché in preparation for providing the image onto an organic product;

FIG. 2-B provides a representative press that comprises a drawer design to house a plate having an image etched theron;

DETAILED DESCRIPTION OF THE PREFERRED EMBODIMENTS

Figure 2:
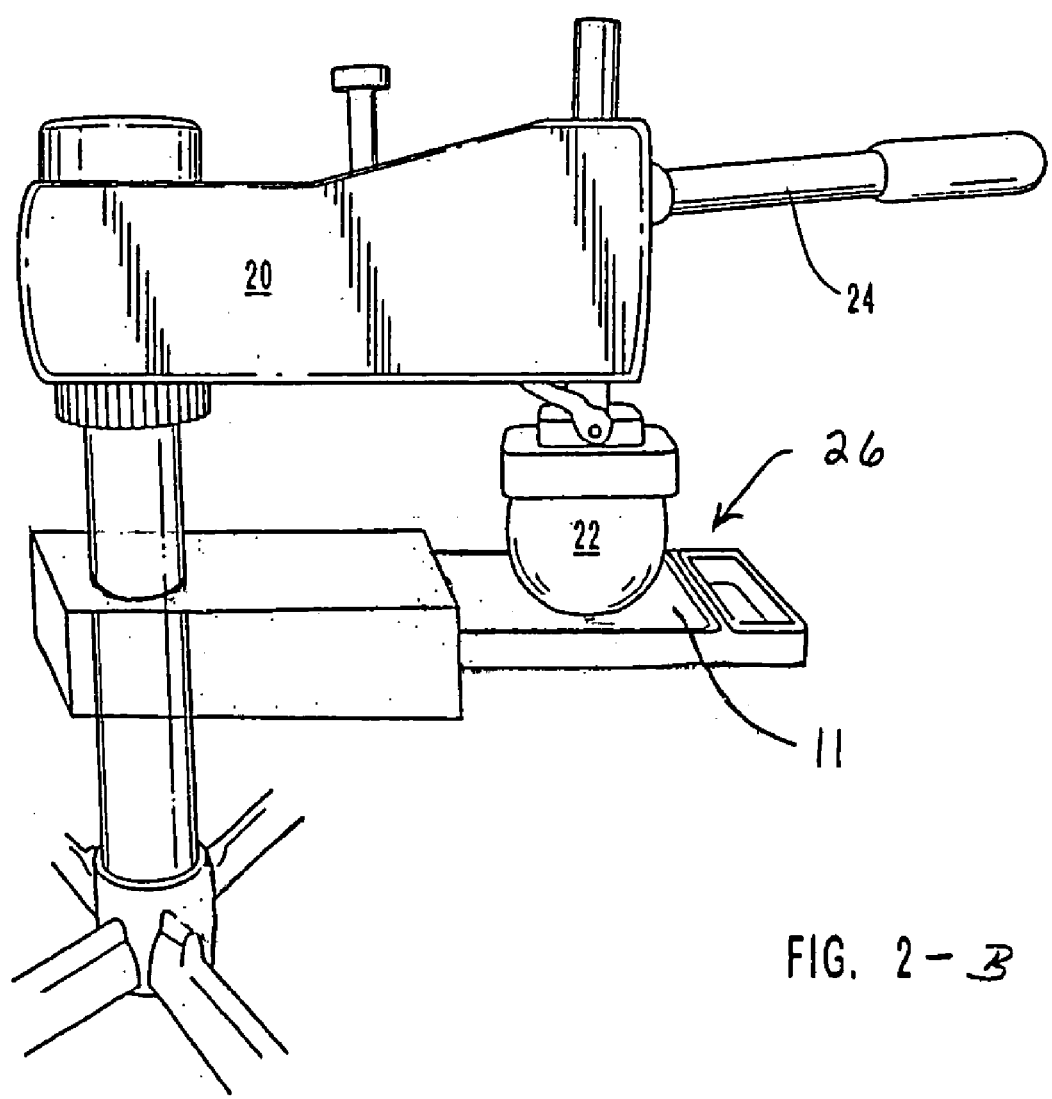
FIG. 2-A provides a representative press that may be used to create an image that is a negative to the image created in the cliché.

It will be readily understood that the components of the present invention, as generally described and illustrated in the figures herein, could be arranged and designed in a wide variety of different configurations. Thus, the following more detailed description of the embodiments of the system and method of the present invention, and represented in FIGS. 1 through 9, is not intended to limit the scope of the invention, as claimed, but is merely representative of the presently preferred embodiments of the invention.

The presently preferred embodiments of the invention will be best understood by reference to the drawings, wherein like parts are designated by like numerals throughout.

The present invention relates to systems and methods for providing an image on an item. More particular, the present invention relates to systems and methods for providing an image, such as one or more characters, symbols, pictures and/or designs, onto an organic product, such as a plant, flower, fruit or portion thereof.

In the disclosure and in the claims the term "organic product" shall refer to "an item of nature or a portion thereof." Examples of organic products include one or more kinds of fruits, flowers, plants, leaves, stems, petals or other natural items that may be used in accordance with the present invention and that are capable of receiving an image thereon. Furthermore, in the disclosure and in the claims the term "image" or "imagery" shall refer to a visual representation that may be provided onto an organic product. Examples of images include one or more characters (e.g. letters, numbers, or other characters), logos, pictures, symbols, illustrations, designs, icons, emblems, trademarks, other representations, and/or any combination thereof.

Embodiments of the present invention embrace providing or printing one or more images onto at least a portion of an organic product, thereby customizing the organic product to the individual or a recipient. The images are provided or printed onto the portion of the organic product to provide a communication to the recipient and/or to individualize the product. The image may include feelings of expression, such as the words "I Love You," "Congratulations," "Thank You," "I'm Sorry," "Merry Christmas," "Get Well Soon," or "Happy Birthday." Alternatively, the image may be a logo of a company, and optionally may include a particular number of years that the recipient has worked for the company. Indeed, any combination or arrangement of characters, symbols, or other images are contemplated herein.

The image may be provided onto an organic product in a variety of manners. For example, the image may be printed, painted, sprayed, copied, transferred, etched, embossed, engraved, scratched, stamped, cut, imprinted, scored, carved or otherwise marked or placed onto at least a portion of an organic product. Each of these is collectively referred to as "printing" for the purposes of the disclosure provided herein.

With reference to FIGS. 1–4, an embodiment of the present invention is illustrated as a representative method for providing an image onto an organic product. In the method, an image is transferred onto an organic product through the use of a transfer printing technique.

In FIG. 1, a cliché, illustrated as plate 10, is provided that includes a photosensitive material 12. While FIG. 1 illustrates the cliché as a plate, other clichés may be used such as a printing plane or other surface that allows an image to be etched therein.

In the present embodiment, an image is etched into the photosensitive material by taking a copy of an image and creating a film positive of the image. (The film positive is the image on clear film.) Once the film positive is created, the photosensitive material of plate 10 is exposed through a wash out process in order to form the etched image 14 in the photosensitive material 12 of plate 10.

FIG. 1 illustrates containers 16, which are used to house ink (not shown). By way of example, container 16*a* may house one type of ink, such as black ink, and container 16*b* may house another type of ink, such as gold ink. Once the etched image 14 is created, ink is applied to the plate 10 so as to fill the etched image 14 on plate 10. A blade 18 is used to spread the ink so as to fill the etched image 14 with ink and to remove any excess ink from the plate 10.

In FIG. 2-A, plate 10 is coupled to a mechanical press 20, which includes a transfer medium, illustrated as pad 22, and a lever 24. Plate 10 may be selectively coupled to press 20 so that the process of creating the etched image 14 is performed prior to coupling plate 10 to press 20. This further allows for the use of a plurality of removable plates that may be selectively used in association with press 20, wherein each plate includes a different image etched thereon.

As a user of press 20 pulls lever 24 in a downward direction, pad 22 lowers and is placed in contact with the surface of plate 10. Similarly, as the user releases or lifts in an upward direction, lever 24 is raised so as to no longer be in contact with plate 10. The process of lowering pad 22 so as to contact plate 10 and of raising pad 22 causes ink to be lifted from the etched image 14 of FIG. 1 so as to create a negative of the image on pad 22.

In one embodiment, pad 22 swivels to facilitate a transfer of the image onto an organic product. In another embodiment, pad 22 is selectively removed by the user from mechanical press 20 of FIG. 2 so as to transfer the image onto an organic product.

In still another embodiment shown in FIG. 2-B, plate 10 and photosensitive material 12 are housed within a drawer 26 supported by press 20 beneath pad 22. To place an image onto pad 22, drawer 26 is simply slid out, thus exposing photosensitive material 12. Pad 22 is then brought down into contact with plate 10 and photosensitive material 12, thus applying a reverse of image 14 thereon. After pad 22 receives the reverse of image 14, drawer 26 with plate 10 and photosensitive material 12 is closed. The image on pad 22 is then applied to an organic product either as indicated above or manually, wherein the organic product, such as a rose, is hand held by the user and manually brought up into contact with pad 22, wherein the organic product may be manipulated by the user to cause the reverse of image 14 to be printed on or applied to the rose. Manually guiding the rose along pad 22 to transfer the image from pad 22 to the rose allows a greater degree of precision to be utilized, as greater care may be taken to ensure the print is exactly as desired. Providing a drawer containing plate 10 and material 12 is advantageous in that pad 22 does not have to rotate or swing out of the way of plate 10 prior to applying the image on pad 22 to the organic product, thus simplifying the process.

Figure 3:
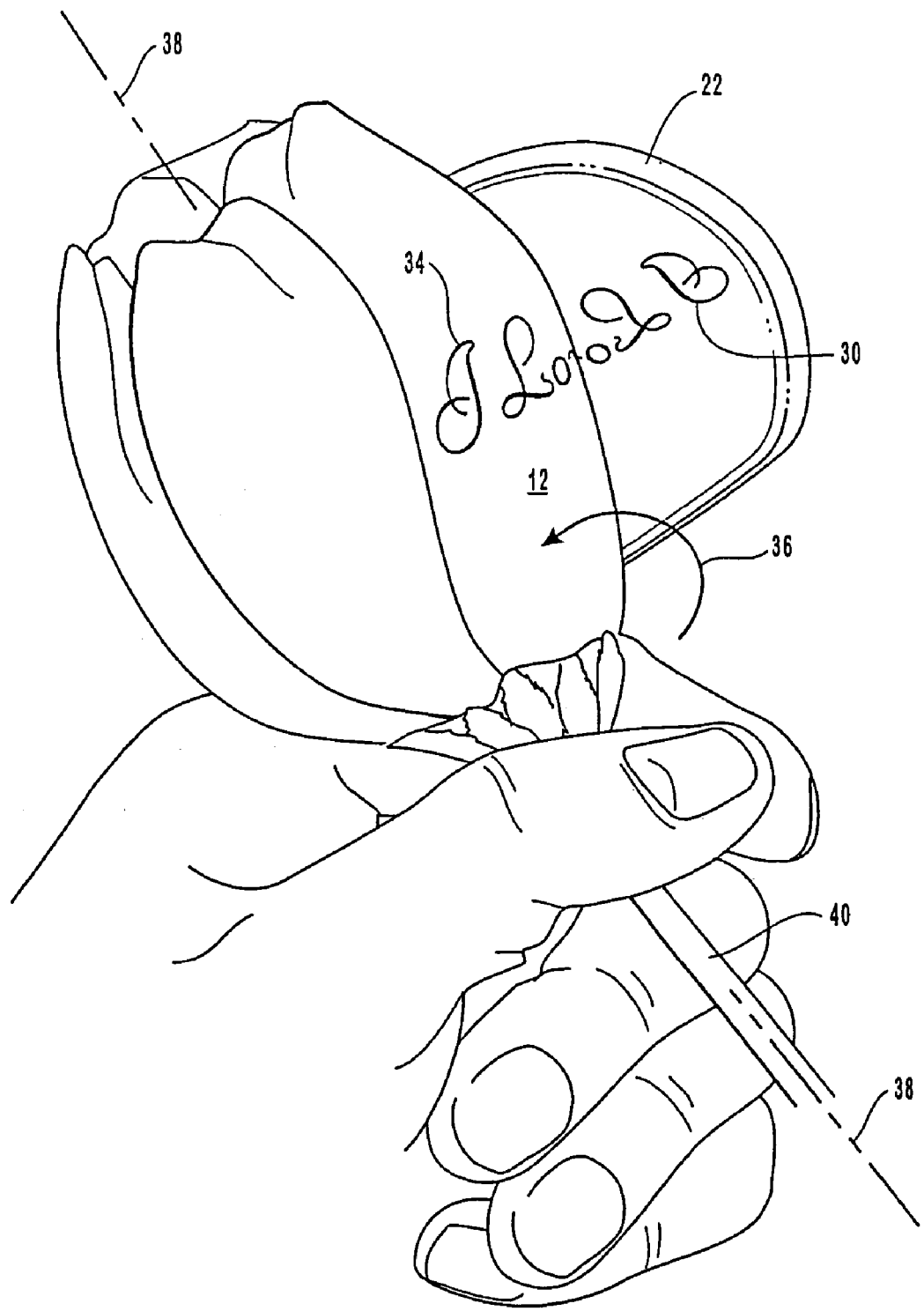
FIG. 3 provides an illustration of the negative image being transferred from the transfer medium to an organic product.

With reference to FIG. 3, a portion of the surface of pad 22 is illustrated that includes the created negative image, illustrated as negative image 30. An organic product, such as flower petal 32, is placed in contact with negative image 30 to provide the image 34 on flower petal 32. In one embodiment, and as illustrated by arrow 36, the organic product is placed in contact with the surface of pad 22 to transfer a clean print of image 34 onto the organic product, such as flower petal 32. While the printed image 34 illustrated in FIG. 3 is located transverse to the central axis 38 of flower 40, the image may be transferred to any location of petal 32 with relation to axis 38. Furthermore, a plurality of images may be transferred onto flower 40.

While the transfer medium illustrated in FIGS. 2 and 3 is a pad, other transfer media may be used in the transfer printing technique, such as a roller or other transfer medium. It is the purpose of the transfer medium to transfer the image from a plate or printing plane, often referred to as a cliché, to a surface or substrate of the organic product.

The present invention also features using computerized printing technology to etch or engrave the image onto a suitable material. The computerized environment is more specifically set forth below in the discussion of FIG. 10. In this embodiment, the image is created within a software application program, such as Word® or WordPerfect®, or any other software program, supported on a computer. Electronically coupled to the computer is an electronic engraver or etcher that functions much like a printer, only it engraves or etches an image onto a suitable material supported within the engraver. The engraver is controlled by the computer using means commonly known in the printing or milling (e.g. CNC milling) industries. The technical details of the computerized technology to be used with the present invention are not specifically described herein as these are commonly known in the art.

In one exemplary, yet preferred, embodiment of the computerized engraving or etching embodiment, the material receiving the image therein comprises a cliché made of plastic in the form of a plastic plate 11. The engraver receives and secures plastic plate 11 therein in preparation for a command from the computer to begin the engraving process. Once the command is received, the engraver simply engraves the image into plastic plate 11 as instructed to do so by the computer. Plastic plate 11 is then removed and secured in press 20, similar to the process as described above with respect to FIG. 2-A, or placed within sliding drawer 26, also described above with respect to FIG. 2-B. At this point, ink is subsequently applied to plastic plate 11 so as to fill the etched image on plastic plate 11. A blade similar to the one described above is used to spread the ink so as to fill the etched image with ink and to remove any excess ink from plastic plate 11. The process of transferring the image onto pad 22 and subsequently to an organic product is also similar to the process described above.

Figure 4:
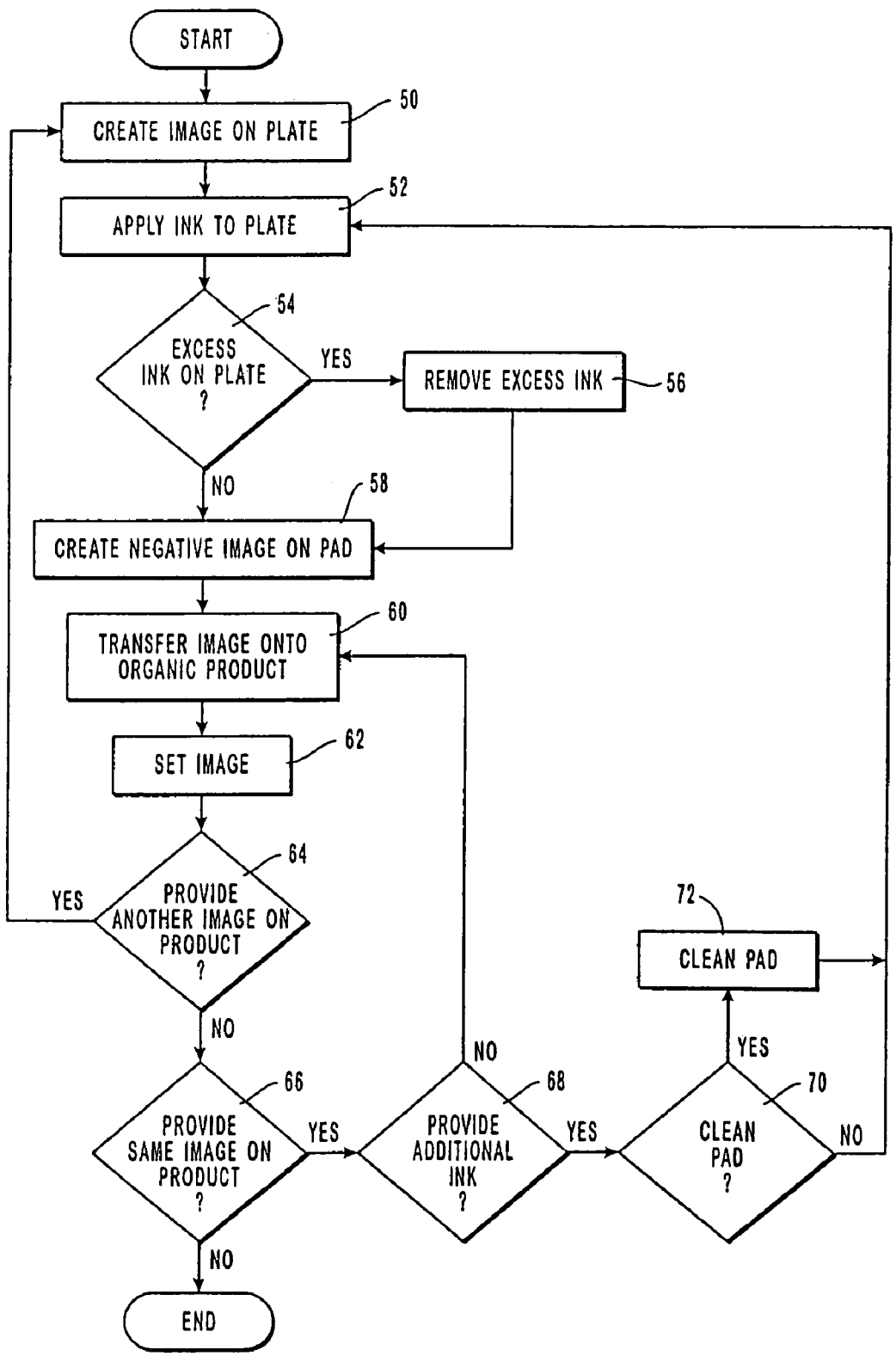
FIG. 4 illustrates a flow chart that provides a representative method for providing an image on an organic product.

With reference to FIG. 4, a flow chart illustrates a representative method used in accordance with the present invention to provide an image on an organic product. In FIG. 4, execution begins at step 50, where an image is created on a cliché, such as plate 10 of FIG. 1. One manner for creating the image, as provided above, is by etching the image into a photosensitive material of the plate, which is done by taking a copy of an image and creating a film positive of the image. Once the film positive is created, the photosensitive material of the plate is exposed through a wash out process in order to form the etched image into the photosensitive material of the plate. Another manner for creating the image is by utilizing computerized printing technology to etch or engrave the image into a plastic (or other suitable material) plate as discussed herein. Execution then proceeds to step 52.

At step 52, ink is applied to the cliché or plate. The ink is applied so as to fill the image created at step 50. A determination is then made at decision block 54 as to whether or not excess ink is located on the plate. If it is determined at decision block 54 that no excess ink is located on the plate, execution proceeds to step 58. However, if it is determined at decision block 54 that excess ink is located on the plate, execution proceeds to step 56, where the excess ink is removed. As provided above, one manner of removing the excess ink is by utilizing a blade, such as blade 18 of FIG. 1. Once the excess ink is removed, execution proceeds to step 58.

At step 58 a negative image is created on a transfer medium, such as pad 22 of FIG. 2. The negative image is created, for example, by causing a transfer medium or pad to be placed in contact with the inked image on the plate. The pad lifts ink from the pad so as to create a negative image on the pad. At step 60 the image is then transferred onto an organic product. This may be performed, for example, by rolling the surface of the pad that includes the negative image onto the surface of an organic product. Execution then proceeds to step 62, where the image on the organic product is set, such as by allowing the printed image to dry.

At decision block 64 a decision is made as to whether or not to provide another image on the product. At times it is advantageous to place a first image at a first location of an organic product and a second image at a second location of the product. Alternatively, it is advantageous to place a first image in a first color (e.g. black) at a first location and a second image, which is similar to the first image except more narrow, in a second color (e.g. gold) on top of the first image. Therefore, the combination of the two images provides the appearance of a single image that is gold with a black border.

Thus, if it is determined at decision block 64 that another image is to be provided on the product, execution returns back to step 50, where the subsequent image is created. The subsequent image may be the same image that is prepared with a different ink or may be an entirely different image. The ink is applied to the subsequent image at step 52 and a determination is made at decision block 54 as to whether or not any excess ink is located on the plate. If excess ink is present, it is removed at step 56, otherwise execution proceeds to step 58 for the creation of a negative of the subsequent image on a pad. The image is transferred onto the organic product at step 60 and is set at step 62. A determination is then made at decision block 64 as to whether or not to apply or provide another image onto the organic product. If yet another image is to be provided, execution returns again to step 50.

Once it is determined at decision block 64 that another image is not to be provided, execution proceeds to decision block 66 for a determination as to whether or not the same image is to be provided onto another organic product. If it is determined that the same image is to be provided onto another organic product, execution proceeds to decision block 68 for a determination as to whether or not to provide additional ink to the transfer medium or pad. If it is determined that no additional ink is needed on the pad, execution returns to step 60, where the image is transferred onto the other organic product and is allowed to set. If another image is to be provided on the other product, execution returns back to step 50.

Returning back to decision block 68, if it is determined that additional ink is needed to transfer the image onto another product, execution proceeds to decision block 70 for a determination as to whether or not to clean the transfer medium or pad. If it is determined that the pad does not need to be cleaned execution returns back to step 52. Alternatively, if it is determined that the pad needs to be cleaned, execution proceeds to step 72, where the pad is cleaned, and then to step 52, where additional ink is applied to the plate. Any excess ink is removed at step 56, a negative is created on the pad at step 58, the image is transferred onto the organic product at step 60, and the image is set at step 62.

Figure 5:
FIG. 5 provides an example of one or more organic products having an image placed thereon in accordance with the present invention.

With reference to FIG. 5, an illustration is provided of organic products 80 that have images 82 thereon that may be used to communicate a message to an intended recipient or otherwise individualize the organic products for the recipient. As illustrated by images 82, the image may be provided in a variety of directions with respect to the central axis of a particular organic product 80. Furthermore, while the methods and processes of the present invention are particularly useful in the floricultural industry, those skilled in the art will appreciate that the methods and processes can be used in a variety of different applications and in a variety of different areas of manufacture to yield printing on organic products or portions thereof.

COMPUTERIZED ORGANIC PRODUCT PRINTING SYSTEM

The present invention further comprises providing or printing an image or character onto an organic product using an organic product printing system controlled by one or more computers, wherein an image is printed directly onto an organic product without requiring the use of etching or engraving technology. The computerized environment is more specifically set forth below in the discussion of FIG. 10. In the following embodiments, the organic product printing system may comprise any type of printing assembly, but preferably comprises an ink jet printing assembly and method or an electrostatic printing assembly and method that each project ink from their respective devices directly onto the organic product, much the same way a printer prints onto a sheet of paper. Other printing assemblies are also intended to be covered herein, such as a laser printing assembly, and various roll-on or contact printing assemblies.

Figure 6:
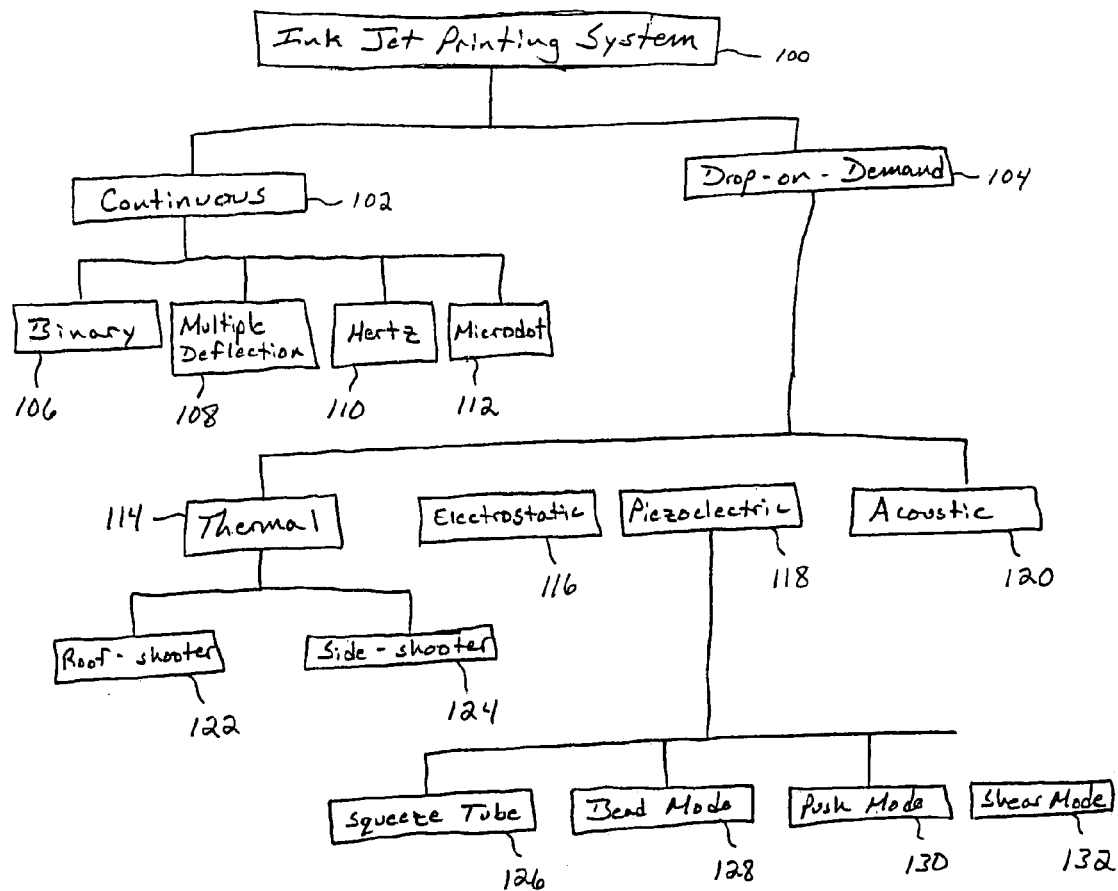
FIG. 6 illustrates a block diagram showing the several types of ink jet printers common in the marketplace.

With reference to FIG. 6, many different types of ink jet printing technologies and/or systems 100 are contemplated herein, two of which are continuous ink jet printing techniques or systems 102 and drop-on-demand ink jet printing techniques or systems 104. Although not limiting, continuous ink jet printing systems 102 comprise binary 106, multiple deflection 108, hertz 110, and microdot 112 type systems. Similarly not limiting, drop-on-demand ink jet printing systems 104 comprise thermal 114, electrostatic 116, piezoelectric 118, and acoustic 120 type systems. Each of these systems are commonly known in the art and are not described in detail herein, except that thermal ink jet printing systems 114 and piezoelectric ink jet printing systems 118 are the most common and function to provide the broadest range of applicable uses. Moreover, it is contemplated and intended that any type of ink jet printing technology may be used in the present invention organic product printing system as taught and claimed herein.

Thermal bubble printing techniques 114, commonly referred to as bubble jet printing, is present in roof-shooter 122 and side-shooter 124 type ink jet printers. In general, thermal printing 114 utilizes tiny resistors that create heat that vaporizes ink to create a "bubble." As the bubble expands, some of the ink is pushed out of a nozzle and onto the organic product. When the bubble pops or collapses, a vacuum is created. This resultantly pulls more ink into the print head from the ink reservoir, wherein the ink is subsequently directed or forced through the nozzles and onto the surface of the organic product.

Piezoelectric printing systems 118 comprise squeeze tube 126, bead mode 128, push mode 130, and shear mode 132 type printing systems. In general, piezoelectric printing systems 118 employ the use of piezo crystals located at the back of the ink reservoir fluidly coupled to each nozzle. The piezo crystal receives an electric charge that causes it to vibrate. When the crystal vibrates inward, it forces a specified amount of ink out of the respective nozzle. When the crystal vibrates outward, it pulls more of the ink into the nozzle to replace that just sprayed out.

The above discussion on thermal and piezoelectric printing systems 114 and 118 is provided only as a general reference and sets forth only one exemplary method of operation of each type. Indeed, as one ordinarily skilled in the art will attest, thermal and piezoelectric printing technologies may differ in their components and methods of operation, as do the other types of ink jet printing systems. As such, the reference and general discussion above is intended therefore, to be for illustration purposes only, thus not limiting the invention in any way.

Figure 7:
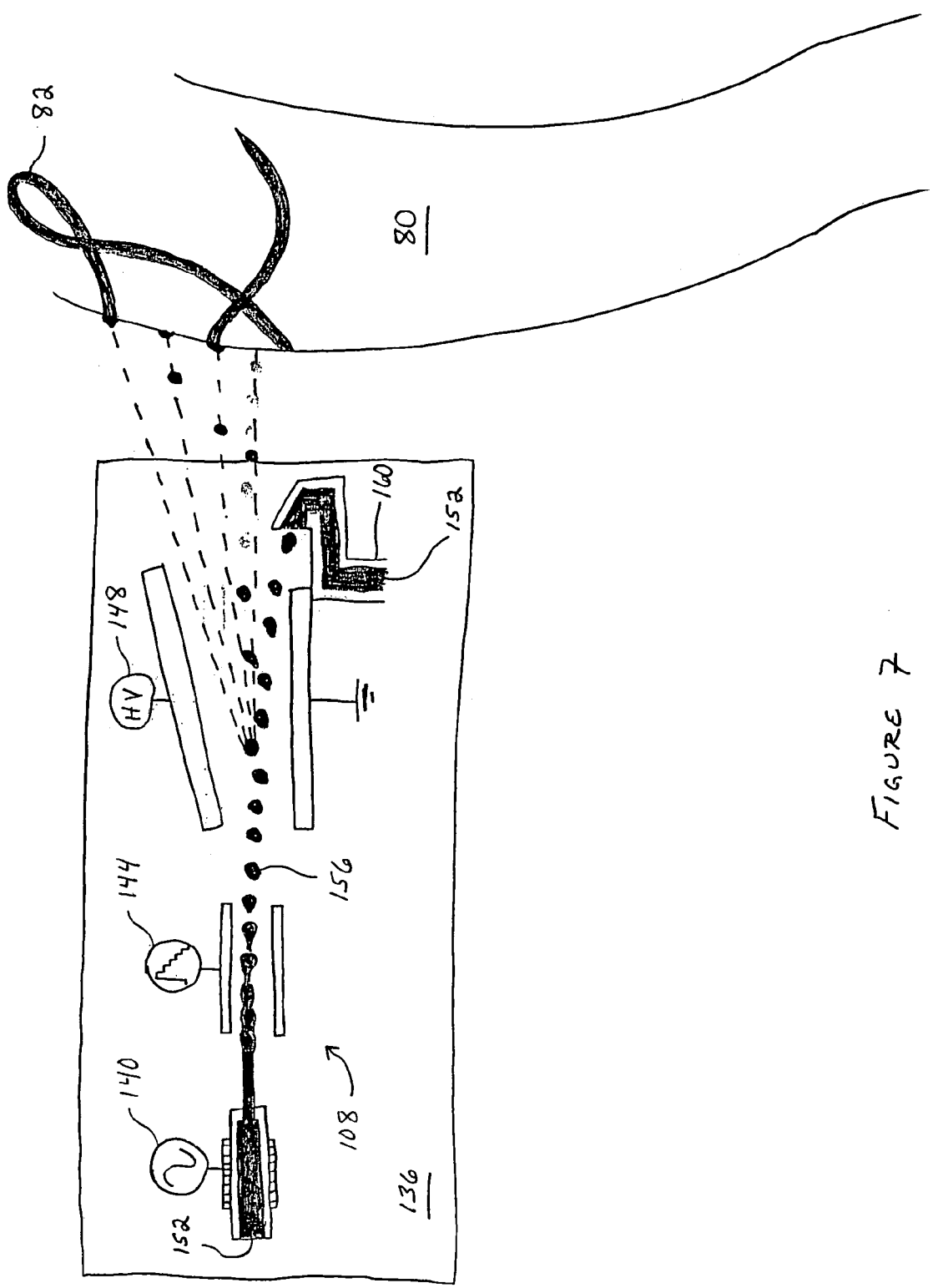
FIG. 7 illustrates a multi-deflection continuous ink jet printing system according to one exemplary embodiment of the present invention.

With reference to FIG. 7, shown is one exemplary embodiment of an ink jet printing assembly, and specifically a multi-deflection, continuous ink jet printing device 108 as contained within print head 136. Depending upon the deflection methodology, a continuous ink jet printing system can be designed as a binary or multiple deflection printing system as discussed in reference to FIG. 6. In a binary deflection system (not shown), the drops of ink are either charged or uncharged, wherein the charged drops are allowed to fly directly onto the organic product to create a printed image, while the uncharged drops are deflected into a gutter for recirculation. In a multiple-deflection, continuous printing system 108, such as the one illustrated in FIG. 7, ink 152 is deposited in a drop generator 140, wherein ink drops 156 are formed. Upon leaving drop generator 140, ink drops 156 are charged by charge electrode 144 and deflected by high voltage deflection plate 148 onto to organic product 80 at different levels. The uncharged drops that are not deflected onto organic product 80 are channeled to gutter 160 where they gather together and pool into ink 152, which is then recirculated.

Figure 8:
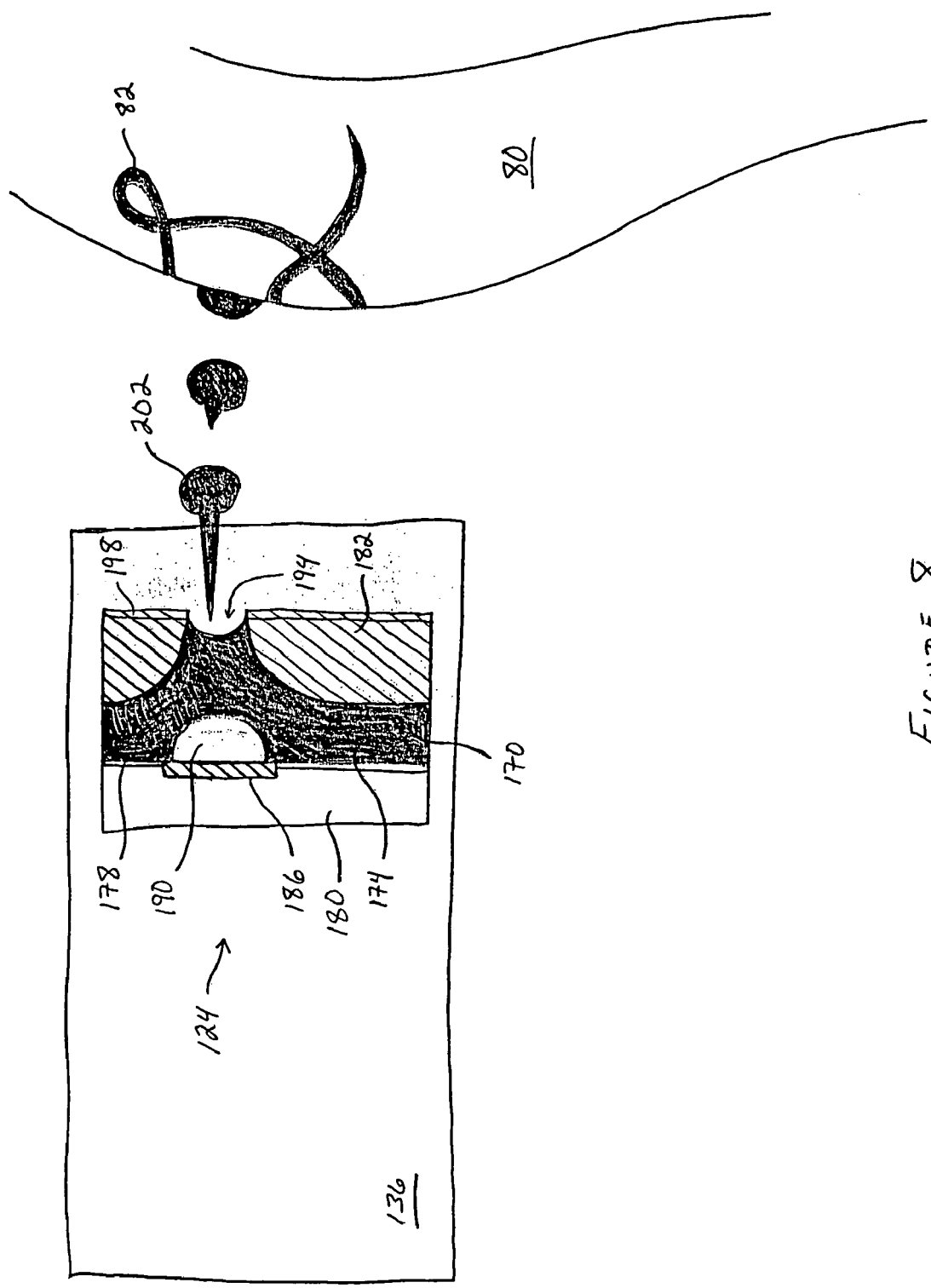
FIG. 8 illustrates drop-on-demand side-shooter thermal ink jet printing system according to one exemplary embodiment of the present invention.

With reference to FIG. 8, shown is another exemplary embodiment of an ink jet printing assembly, and specifically a drop-on-demand side-shooter thermal ink jet printing device 124 as contained within print head 136. As stated, many ink jet printers employ either thermal or piezoelectric technology. A thermal ink jet printer, particularly one utilizing the side-shooter technology, is an impulse inkjet configuration in which the ink droplets exit at a right angle to the bubble firing element. As shown in FIG. 8, side-shooter printing device 124 comprises an ink channel 170 that contains or houses ink 174. Ink channel 170 is defined on each side by a silicon substrate 180 and ink barrier 182. Adjacent ink channel 170 is thin film conductor 178 and adjacent thin film conductor 178 is thin film resistor 186 that is designed and used to supply heat to ink 174. Thin film resistor 186 rapidly heats a thin layer of ink 174 within ink channel 170, which thus vaporizes a tiny fraction of ink 174 to form an expanding bubble or vapor bubble 190. Vapor bubble 190 subsequently causes to eject an ink drop 202 through orifice 194 of orifice plate 198 and onto organic product 80 to produce printed image 82.

Figure 9:
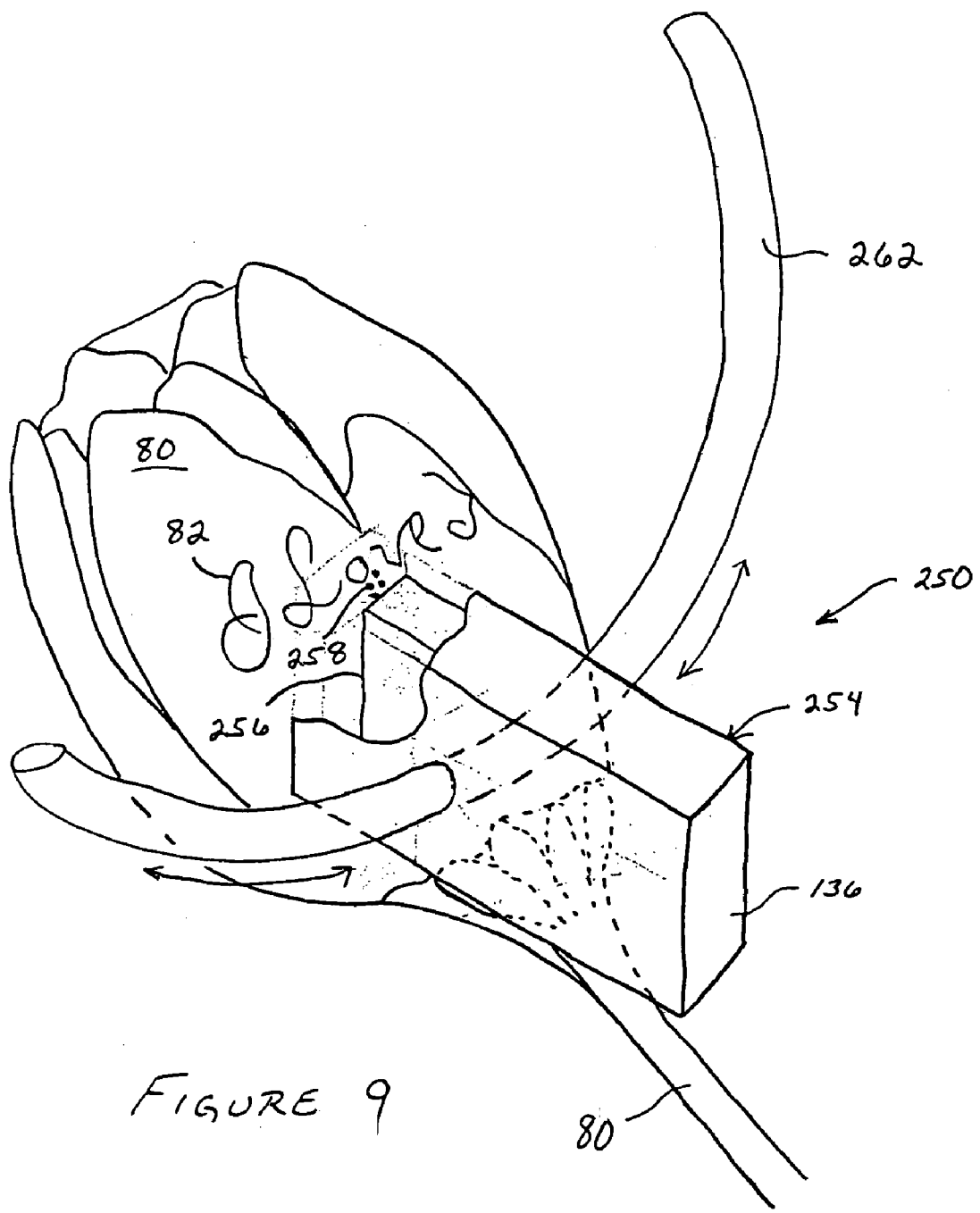
FIG. 9 illustrates one exemplary embodiment of an organic product printing system as comprising an ink jet printing system.

With reference to FIG. 9, shown is one exemplary embodiment of an organic product printing system having an ink jet printing assembly, such as one of those discussed above, thus illustrating one representative system and method for providing or printing an image onto an organic product using one or more types of ink jet printing technology.

Specifically, FIG. 9 illustrates organic product printing system 250 as comprising a printing assembly 254, and particularly one type of ink jet printing device 256 as contained within print head 136. Organic product printing system 250 further comprises a support structure (not shown in its entirety) that supports print head 136, printing assembly 254, and one or more organic products 80. The support structure essentially secures each component or element for and during the printing process. Preferably, the support structure provides for or accommodates single, batch, and/or systematic (e.g. continuous) printing onto an organic product. Essentially, the support structure systematically allows one or more organic products to be brought into a proper position, and also allows a single organic product to be individually positioned therein. Once in place, printing assembly 254 is brought into a position proximate organic product 80 and printing device 256 is caused to administer or print one or more images 82 onto organic product 80. Moreover, the present invention contemplates that the support structure may be designed to house any type of printing system, not just an ink jet printing system. Having said this, the present invention contemplates being able to print an image onto an organic product using any such printing system. In any event, the support structure may take on any form and may comprise any type of design capable of supporting at least a printing system and an organic product, such that the organic product may have printed thereon an image via the printing system. As such, the specific design of the support structure is not set forth in any detail herein, but is left to one of ordinary skill in the art.

In the embodiment shown in FIG. 9, support structure comprises at least a stabilizer bar 262 that supports printing assembly 254, and particularly print head 136 and ink jet printer device 256 (or any other type of printing device) contained therein, and that provides a track along which print head 136 may travel during the printing process, as indicated by the arrows. Stabilizer bar 262 preferably comprises a curved design to allow print head 136 to stay as parallel to the print surface of organic product 80 as possible, as well as to conform to the small size and typically circular or spherical shape of organic product 80. For example, in this instance, a rose is secured within the support structure and has an image printed thereon. Stabilizer bar 262 may, of course, comprise any shape, and may even be interchangeable, to accommodate different sized and shaped organic products.

As stated, the support structure is designed to support and function with several printing elements. In the exemplary embodiment shown in FIG. 9, organic product printing system 250 specifically comprises an ink jet printing assembly 254. Utilizing ink jet technology, printing assembly 254 essentially functions to project ink 258 onto organic product 80 secured within the support structure to create or print various images or imagery 82 onto organic product 80. Ink jet printing assembly 254 comprises all of the component parts or elements necessary for operation of organic product printing system 250. For example, printing assembly 254 may comprise print head 136 which houses or supports ink jet printing device 256, a drive means (not shown) for driving print head 136 along stabilizer bar 262, a power supply (also not shown) for providing power to said drive means and printing assembly 254, and at least one ink reservoir (not shown) in fluid connection with ink jet printing device 256 and containing the specified type and amount of ink 258 to be printed onto organic product 80. Organic product printing system 250 further comprises system control means for controlling the operation of each element and system within organic product printing system 250. System control means preferably comprises various computer circuitry and memory storage devices for controlling and operating organic product printing system 250.

As printing assembly 254 is shown as comprising an ink jet printing device 256, ink jet printing device 256 therefore utilizes a plurality of nozzles within print head 136 (thus comprising a print head assembly) that are fluidly coupled to one or more ink reservoirs, wherein the nozzles are designed to systematically or selectively spray or apply drops of ink 258 onto organic product 80. Ink reservoirs are commonly known in the art and may comprise ink cartridges or ink sources capable of providing more continuous application of ink to the organic product, such as pressurized tanks that supply continuous feeds of ink to the print head within a manufacturing or production printing process. In addition, ink reservoir may comprise ink in various colors.

The type of ink used is preferably that which will properly adhere to the surface of an organic product. One ordinarily skilled in the art will be able to determine the most appropriate ink for the current printing job.

The present invention further contemplates providing an electrostatic-type printing assembly. Although several specific types and methods of electrostatic printing technology exists, these are not specifically recited herein. Suffice it to say that the present invention contemplates using any and all types of electrostatic printing assemblies and associated printing methods known in the art.

The present invention further features utilizing a printing template to define the image printed onto the organic product. The printing template preferably has an image formed therein that dictates what the image on the organic product is to look like. The printing template may be part of the printing assembly or the printing template may be independent therefrom.

Thus, as discussed herein, the embodiments of the present invention embrace systems and methods for providing an image on an item. More particular, the present invention relates to systems and methods for providing an image, such as one or more characters, symbols, pictures and/or designs, onto an organic product, such as a plant, flower, fruit or portion thereof.

Exemplary Operating Environment for
Computerized Organic Product Printing System The following discussion sets forth the various computer technology that may be utilized to provide the computerized image engraving system as discussed and set forth above. The following discussion also pertains to the several computerized organic product printing systems, also discussed above, wherein the printing system prints an image directly onto the organic product.

Figure 10:
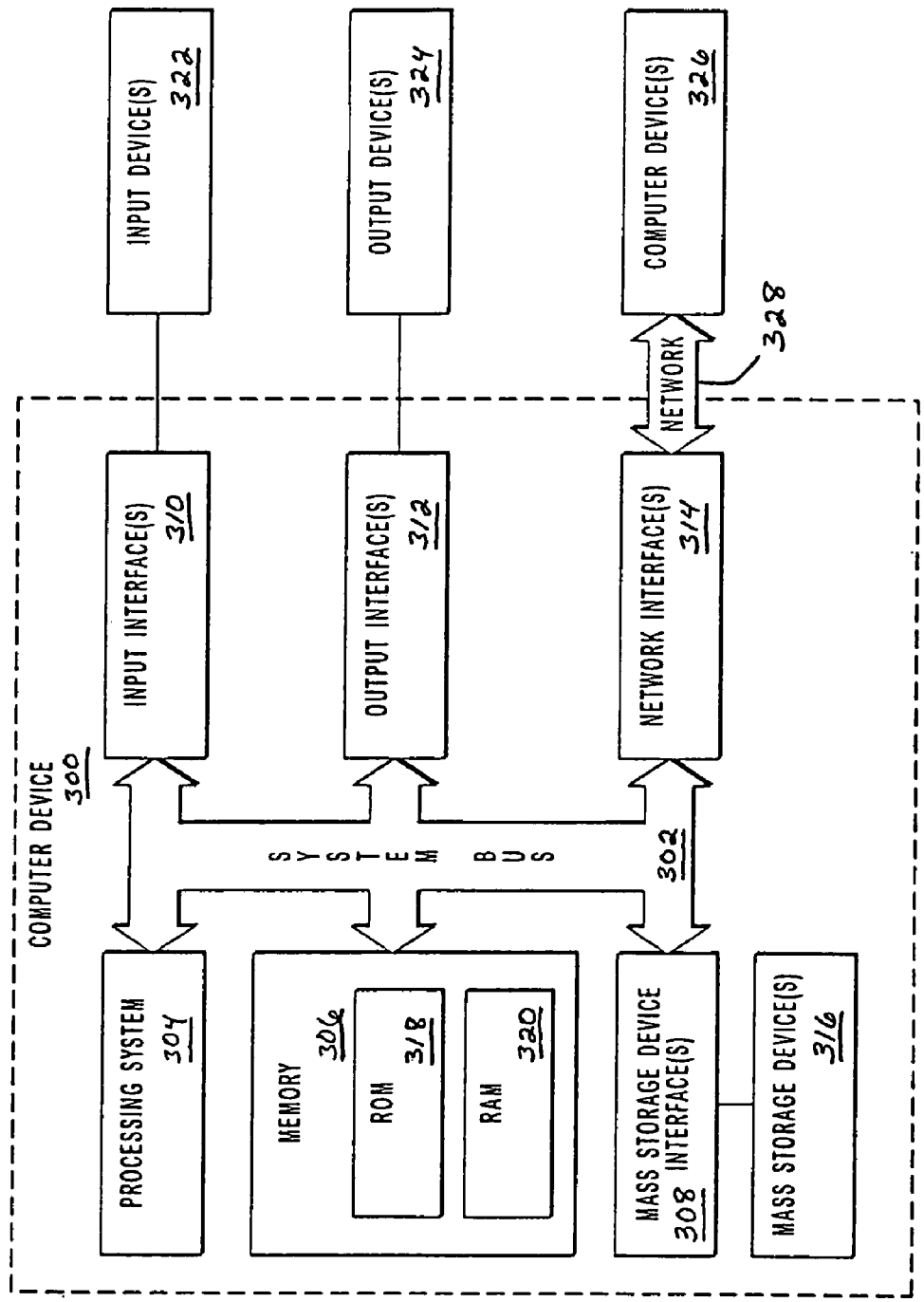
FIG. 10 illustrates a representative computer system that provides a suitable operating environment for use with the computerized system embodiments of the present invention.

FIG. 10 and the corresponding discussion are intended to provide a general description of a suitable operating environment in which the applicable embodiments of the present invention may be implemented to obtain and/or provide information relating to printing on an organic product using one or more computerized methods and systems. One skilled in the art will appreciate that the invention may be practiced by one or more computing devices and in a variety of system configurations, including in a networked configuration.

Embodiments of the present invention embrace one or more computer readable media, wherein each medium may be configured to include or includes thereon data or computer executable instructions for manipulating data. The computer executable instructions include data structures, objects, programs, routines, or other program modules that may be accessed by a processing system, such as one associated with a general-purpose computer capable of performing various different functions or one associated with a special-purpose computer capable of performing a limited number of functions. Computer executable instructions cause the processing system to perform a particular function or group of functions and are examples of program code means for implementing the steps for the computerized printing methods disclosed herein. Furthermore, a particular sequence of the executable instructions provides an example of corresponding acts that may be used to implement such steps. Examples of computer readable media include random-access memory ("RAM"), read-only memory ("ROM"), programmable read-only memory ("PROM"), erasable programmable read-only memory ("EPROM"), electrically erasable programmable read-only memory ("EEPROM"), compact disk read-only memory ("CD-ROM"), or any other device or component that is capable of providing data or executable instructions that may be accessed by a processing system.

With reference to FIG. 10, a representative system for implementing the invention includes computer device 300, which may be a general-purpose or special-purpose computer. For example, computer device 300 may be a personal computer, a notebook computer, a personal digital assistant ("PDA") or other hand-held device, a workstation, a minicomputer, a mainframe, a supercomputer, a multi-processor system, a network computer, a processor-based consumer electronic device, or the like.

Computer device 300 includes system bus 302, which may be configured to connect various components thereof and enables data to be exchanged between two or more components. System bus 302 may include one of a variety of bus structures including a memory bus or memory controller, a peripheral bus, or a local bus that uses any of a variety of bus architectures. Typical components connected by system bus 302 include processing system 304 and memory 306. Other components may include one or more mass storage device interfaces 308, input interfaces 310, output interfaces 312, and/or network interfaces 314, each of which will be discussed below.

Processing system 304 includes one or more processors, such as a central processor and optionally one or more other processors designed to perform a particular function or task. It is typically processing system 304 that executes the instructions provided on computer readable media, such as on memory 306, a magnetic hard disk, a removable magnetic disk, a magnetic cassette, an optical disk, or from a communication connection, which may also be viewed as a computer readable medium.

Memory 16 includes one or more computer readable media that may be configured to include or includes thereon data or instructions for manipulating data, and may be accessed by processing system 304 through system bus 302. Memory 306 may include, for example, ROM 318, used to permanently store information, and/or RAM 320, used to temporarily store information. ROM 318 may include a basic input/output system ("BIOS") having one or more routines that are used to establish communication, such as during start-up of computer device 300. RAM 320 may include one or more program modules, such as one or more operating systems, application programs, and/or program data.

One or more mass storage device interfaces 308 may be used to connect one or more mass storage devices 316 to system bus 302. The mass storage devices 316 may be incorporated into or may be peripheral to computer device 300 and allow computer device 300 to retain large amounts of data. Optionally, one or more of the mass storage devices 26 may be removable from computer device 300. Examples of mass storage devices include hard disk drives, magnetic disk drives, tape drives and optical disk drives. A mass storage device 316 may read from and/or write to a magnetic hard disk, a removable magnetic disk, a magnetic cassette, an optical disk, or another computer readable medium. Mass storage devices 316 and their corresponding computer readable media provide nonvolatile storage of data and/or executable instructions that may include one or more program modules such as an operating system, one or more application programs, other program modules, or program data. Such executable instructions are examples of program code means for implementing steps for methods disclosed herein.

One or more input interfaces 310 may be employed to enable a user to enter data and/or instructions to computer device 10 through one or more corresponding input devices 322. Examples of such input devices include a keyboard and alternate input devices, such as a mouse, trackball, light pen, stylus, or other pointing device, a microphone, a joystick, a game pad, a satellite dish, a scanner, a camcorder, a digital camera, and the like. Similarly, examples of input interfaces 310 that may be used to connect the input devices 322 to the system bus 302 include a serial port, a parallel port, a game port, a universal serial bus ("USB"), a firewire (IEEE 1394), or another interface.

One or more output interfaces 312 may be employed to connect one or more corresponding output devices 324 to system bus 302. Examples of output devices include a monitor or display screen (e.g., a television or other monitor), a speaker, a printer, and the like. A particular output device 324 may be integrated with or peripheral to computer device 300. Examples of output interfaces include a video adapter, an audio adapter, a parallel port, and the like.

One or more network interfaces 314 enable computer device 300 to exchange information with one or more other local or remote computer devices, illustrated as computer devices 326, via a network 328 that may include hardwired and/or wireless links. Examples of network interfaces include a network adapter for connection to a local area network ("LAN") or a modem, wireless link, or other adapter for connection to a wide area network ("WAN"), such as the Internet. The network interface 314 may be incorporated with or peripheral to computer device 300. In a networked system, accessible program modules or portions thereof may be stored in a remote memory storage device. Furthermore, in a networked system computer device 300 may participate in a distributed computing environment, where functions or tasks are performed by a plurality of networked computer devices.

Those skilled in the art will appreciate that embodiments of the present invention may be practiced in networked computing environments with many types of system configurations that embrace the obtaining and/or providing of organic product printing information. For example, one system may include a networked environment that comprises one or more clients connected to a server via a network. Moreover, embodiments in accordance with the present invention also include a multitude of clients throughout the world connected to a network, where the network is a wide area network, such as the Internet. The specific methods for obtaining and/or providing computerized organic product printing information is discussed above with respect to each embodiment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. In a computer system, a method for providing an image on an organic, the method comprising the steps for:
    creating an electronic image within a computer software program supported on a computer system;
    executing a command to send said electronic image to a printing device;
    processing said command by said printing device;
    printing an image via said computer system;
    engraving a first image on a cliché using a computerized engraver controlled by said computer system;
    applying ink to said cliché;
    lifting at least a portion of the ink from the cliché to form a second image, wherein the second image is said image created on a transfer medium; and manually transferring said image onto an organic product.

2. The method of claim 1, wherein said printing device is selected from the group consisting of an ink jet printer, a laser printer, an electrostatic printer, a contact printing device, a computerized engraver, and other similar printing systems.

3. The method of claim 1, wherein said step of printing an image comprises printing said image directly onto said organic product via said printing device.

4. The method as recited in claim 1, wherein the cliché is engraved by a computerized laser engraver.

5. The method of claim 1, wherein multiple cliché are placed on a bed is engraved by a mechanical router.

6. The method of claim 1, wherein, wherein multiple cliché are simultaneously placed on one bed to be engraved sequentially by said computerized engraver without operator intervention.

7. The method of claim 1, wherein multiple independent designs are engraved on said cliché.

8. The method of claim 1, wherein the cliché is made of plastic.

9. An organic product produced according to the method of claim 1.

* * * * *